United States Patent
Park et al.

(10) Patent No.: US 11,143,316 B2
(45) Date of Patent: Oct. 12, 2021

(54) VALVE ASSEMBLY AND SEAL MEMBER APPLIED TO THE VALVE ASSEMBLY

(71) Applicants: HYUNDAI MOTOR COMPANY, Seoul (KR); KIA MOTORS CORPORATION, Seoul (KR)

(72) Inventors: Hun Woo Park, Namyangju-si (KR); Sung Wook Na, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/065,699

(22) Filed: Oct. 8, 2020

(65) Prior Publication Data
US 2021/0108731 A1 Apr. 15, 2021

(30) Foreign Application Priority Data
Oct. 11, 2019 (KR) ........................ 10-2019-0125794

(51) Int. Cl.
*F16K 5/18* (2006.01)
*F16K 5/04* (2006.01)
*F01P 7/14* (2006.01)

(52) U.S. Cl.
CPC ............ *F16K 5/188* (2013.01); *F16K 5/0407* (2013.01); *F16K 5/0471* (2013.01); *F01P 2007/146* (2013.01)

(58) Field of Classification Search
CPC ..... F01P 2007/146; F01P 7/14; F16K 11/087; F16K 11/0873; F16K 11/0876; F16K 5/0471; F16K 5/0678; F16K 5/0673; F16K 5/0689; F16K 5/181; F16K 5/188; F16K 5/201; F16K 5/205; F16K 5/208; F16K 5/0407; F16K 5/0605
See application file for complete search history.

(56) References Cited

U.S. PATENT DOCUMENTS

| | | | | |
|---|---|---|---|---|
| 2,201,895 A | * | 5/1940 | McKinnon | F16K 5/0636 251/172 |
| 2,297,161 A | * | 9/1942 | Newton | F16K 5/0668 251/315.12 |
| 2,606,738 A | * | 8/1952 | McKinnon | F16K 5/201 251/315.14 |
| 3,210,042 A | * | 10/1965 | Freeman | F16K 5/0678 251/175 |
| 3,244,398 A | * | 4/1966 | Scaramucci | F16K 5/0689 251/148 |

(Continued)

FOREIGN PATENT DOCUMENTS

KR 10-2015-0136174 A 12/2015

*Primary Examiner* — David Colon-Morales
(74) *Attorney, Agent, or Firm* — Lempia Summerfield Katz LLC (57) ABSTRACT

The present disclosure provides a seal member that is applied to a valve assembly. The seal member includes: a cylindrical metal part supporting the seal member and defining a channel through which cooling water flows; and a valve seat provided to surround an outer surface of the cylindrical metal part and keeping the valve assembly hermetic, in which the valve seat has a first sealing portion protruding from a second end of the cylindrical metal part in an opposite direction to a direction in which the cylindrical metal part extends.

14 Claims, 5 Drawing Sheets

(56) References Cited

U.S. PATENT DOCUMENTS

| | | | | |
|---|---|---|---|---|
| 3,356,337 | A * | 12/1967 | Olen | F16K 5/0631 |
| | | | | 251/315.13 |
| 3,486,733 | A * | 12/1969 | Gordon, Jr. | F16K 5/0673 |
| | | | | 251/172 |
| 4,061,307 | A * | 12/1977 | Yoshiike | F16K 5/0673 |
| | | | | 251/315.08 |
| 4,071,220 | A * | 1/1978 | Iino | F16K 5/0678 |
| | | | | 251/174 |
| 4,494,730 | A * | 1/1985 | George | F16K 27/062 |
| | | | | 251/309 |
| 8,500,090 | B2 * | 8/2013 | Hubacek | F16J 15/028 |
| | | | | 251/171 |
| 9,617,906 | B2 * | 4/2017 | Lee | F01P 7/14 |
| 9,695,734 | B2 * | 7/2017 | Carns | F16K 5/0605 |
| 9,793,557 | B2 * | 10/2017 | Na | H01M 8/04044 |
| 9,897,217 | B2 * | 2/2018 | Greene | F16K 11/085 |
| 10,352,460 | B2 * | 7/2019 | Jang | F16K 5/201 |
| 10,513,968 | B2 * | 12/2019 | Yumisashi | F01P 7/16 |
| 10,794,488 | B2 * | 10/2020 | Yagi | F16K 5/06 |
| 10,816,100 | B2 * | 10/2020 | Na | F16K 5/0689 |
| 2015/0188157 | A1 * | 7/2015 | Na | F16K 11/0853 |
| | | | | 137/625 |
| 2016/0010536 | A1 * | 1/2016 | Murakami | F16K 11/076 |
| | | | | 137/625.44 |
| 2016/0146092 | A1 * | 5/2016 | Lee | F01P 7/16 |
| | | | | 123/41.1 |
| 2018/0340620 | A1 * | 11/2018 | Wicher | F16J 15/104 |

* cited by examiner

VALVE ASSEMBLY AND SEAL MEMBER APPLIED TO THE VALVE ASSEMBLY

CROSS REFERENCE TO RELATED APPLICATION

This application claims priority to and the benefit of Korean Patent Application No. 10-2019-0125794, filed on Oct. 11, 2019, the entire contents of which are incorporated herein by reference.

FIELD

The present disclosure relates to a valve assembly, and a seal member applied to the valve assembly.

BACKGROUND

The statements in this section merely provide background information related to the present disclosure and may not constitute prior art.

An electric vehicle (EV) has been actively studied because it is considered as the most possible alternative that can solve the problems with automotive air pollution and energy in the future. An electric vehicle may be equipped with various kinds of valve devices that can distribute, control, and connect/disconnect flow of fluid for a cooling water circuit, an air circuit, a coolant circuit, etc. of a battery.

In these various kinds of valve devices, a rotary valve includes a valve body having two or more ports, and a valve member that selectively opens/closes two or more ports by rotating about a rotary shaft in the valve body. The rotary valve is generally used for the cooling water circuit of a battery. In general, rotary valves are composed of: a valve body having an inlet port and an outlet port that communicate with a valve chamber; a cylindrical valve member disposed to rotate between an open position and a closed position in the valve chamber; a curved seal member disposed between any one of the inlet port or the outlet port and the valve member; a torque motor attached to the valve body and rotating the valve member; a spring member elastically biasing a rotor of the torque motor and the valve member to open the rotor and the valve member, etc. According to the rotary valve, when the inlet port or the outlet port of the valve body is opened by rotation of the valve member, the seal member elastically disposed between the ports of the valve body and the valve member seals the portion between the inlet port or the outlet port to prevent leakage of fluid from the inlet port or the outlet port.

However, we have discovered that since the elasticity of the elastic seal member is low in the rotary valves of the related art, the ability to seal the inlet port or the outlet port is insufficient, so there is a problem that a lot of fluid leaks. Further, there is another problem that the configuration of the seal member is complicated and the seal member is deformed under a high-temperature driving condition of a vehicle.

SUMMARY

The present disclosure provides a seal member having a simple configuration.

The present disclosure also provides a seal member that can improve the ability to seal the portions between ports and a valve assembly, using the pressure of cooling water, and a valve assembly.

The present disclosure further provides a seal member that is less deformed even by high temperature and friction with a valve member.

In one form of the present disclosure, a seal member that is applied to a valve assembly includes: a cylindrical metal part supporting the seal member and defining a channel through which cooling water flows; and a valve seat provided to surround an outer surface of the cylindrical metal part and keeping the valve assembly hermetic, in which the valve seat has a first sealing portion protruding from a first end of the cylindrical metal part in an opposite direction to a direction in which the cylindrical metal part extends.

The cylindrical metal part may be made of a metal material and the valve seat may be made of a rubber material.

The valve seat may have a protrusion protruding from a second end of the cylindrical metal part toward the channel, and a first surface of the protrusion has a slope with respect to the direction in which the cylindrical metal part extends.

The first sealing portion may extend with a slope with respect to the direction, in which the cylindrical metal part extends away from the channel defined by the seal member.

The first sealing portion may have elasticity to absorb pressure by a valve member being in contact with the seal member.

The seal member may further include a second sealing portion protruding from a second end of the cylindrical metal part in the direction in which the cylindrical metal part extends.

An end of the second sealing portion is rounded.

A portion of the first end of the cylindrical metal part may be exposed through an opening of the valve seat, and the exposed portion at the first end of the cylindrical metal part may be cooled by cooling water.

In another form of the present disclosure, a valve assembly controlling circulation of fluid includes: a valve body having at least two ports on an outer surface thereof, and having an internal space that communicates with the ports; a valve member that is rotatably disposed in the internal space of the valve body and opens and closes the at least two ports; and seal members respectively sealing the at least two ports. In particular, the seal members each include: a cylindrical metal part supporting a corresponding seal member among the seal members and defining a channel through which cooling water flows; and a valve seat surrounding an outer surface of the cylindrical metal part and keeping a portion between the seal member and the valve member hermetic. In another form, the valve seat has a first sealing portion provided in an area opposite to the valve member with the cylindrical metal part therebetween and extending in an opposite direction to the valve member.

The valve seat may further have a protrusion disposed in an area close to the valve member and protruding toward the channel, and the first sealing portion may extend diagonally with respect to a second end of the cylindrical metal part and extend away from the channel.

The first sealing portion may have elasticity to absorb pressure by the valve member being in contact with the corresponding seal member, and the first sealing portion may be compressed toward an insertion space in which the corresponding seal member is inserted by pressure of cooling water.

The valve assembly may further include a second sealing portion protruding from a first end of the cylindrical metal part in a direction in which the cylindrical metal part extends, and the second sealing portion is in contact with the valve member.

In some forms, a first surface of the protrusion may have a slope with respect to the direction in which the cylindrical metal part extends, and pressure provided by cooling water may be transmitted to the first surface of the protrusion, thereby improving ability to keep a portion between the second sealing portion and the valve member hermetic.

A first end of the cylindrical metal part may be close to the valve member and a second end of the cylindrical metal part may be close to a flange of the port.

According to one form of the present disclosure, the configuration of the seal member can be simplified, as compared with existing seal members. Accordingly, the cost for maintaining the valve assembly can be reduced. Further, the process of manufacturing the seat member can also be simplified.

According to another form of the present disclosure, the seal member can improve the ability to keep the portion between the inner wall of each of the ports and the valve member, using the phenomenon that the first sealing portion and the protrusion are compressed by the pressure of cooling water.

According to other form of the present disclosure, deformation of the seal member can be reduced even by rotation of the valve member because of the shape of the second sealing portion of the seal member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The advantages and features of the present disclosure, and methods of achieving them will be clear by referring to the exemplary forms that will be described hereafter in detail with reference to the accompanying drawings. However, the present disclosure is not limited to the exemplary forms described hereafter and may be implemented in various ways, and the exemplary forms are provided to complete the description of the present disclosure and let those skilled in the art know the scope of the present disclosure.

Some components are given terms 'first', 'second', etc. for discrimination throughout the specification because they have the same names, but they are not necessarily limited to the order in the following description.

Further, the description provides some forms of the present disclosure and the present disclosure may be used in other various combination, changes, and environments. That is, the present disclosure may be changed or modified within the scope of the present disclosure described herein, a range equivalent to the description, and/or within the knowledge or technology in the related art. Therefore, the detailed description of the present disclosure is not intended to limit the present disclosure in the exemplary forms.

Figure 1:
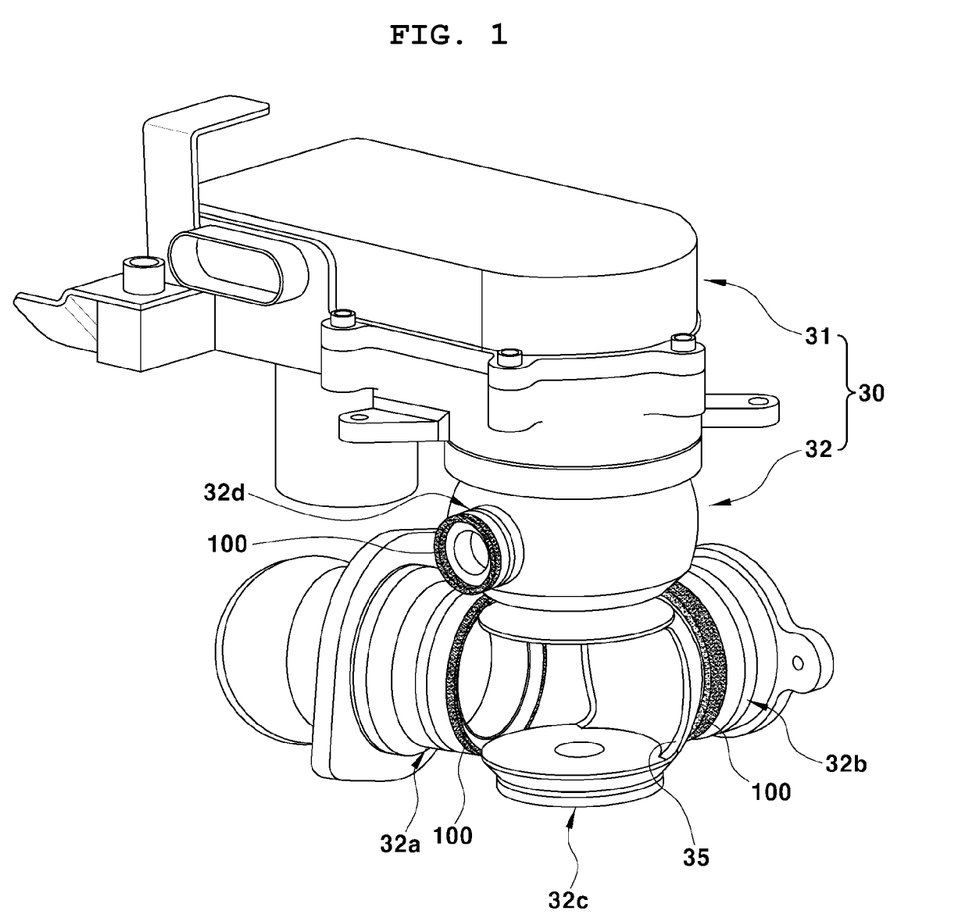
FIG. 1 is a perspective view showing a valve assembly in one form of the present disclosure.

FIG. 1 is a view showing a valve assembly according to one form of the present disclosure.

Referring to FIG. 1, the valve assembly for an electric vehicle may include: a least a plurality of ports 32a, 32b, 32c, and 32d, a body part 31 being mounted on a heat management system of a vehicle, and a valve part 32 rotatably connected to the body part 31 and connecting/disconnecting flow of low-temperature cooling water and high-temperature cooling water. The valve part 32 may include a valve member 35 being in contact with the ports 32a, 32b, 32c, and 32d. The valve assembly 30 may be a 3-way valve or a 4-way valve. In another form, the valve assembly 30 may be a 4-way valve.

The valve part 32 may have a first port 32a that is connected to a radiator (not shown) and into which low-temperature cooling water or high-temperature cooling water flows, a second port 32b that is connected to a fuel cell stack (not shown) and provides cooling water, a third port 32c for discharging cooling water to a pump (not shown), and a fourth port 32d that is connected to an ion filter loop (not shown). However, unlike this example, the connection relationship of the ports 32a, 32b, 32c, and 32d and components of a vehicle may be changed by a change in design.

The first port 32a may allow only low-temperature cooling water to flow inside, high-temperature cooling water to flow inside, or both low-temperature cooling water high-temperature cooling water to flow inside, depending on rotation of the valve member 35. The first port 32a may be connected to the radiator (not shown) to allow low-temperature cooling water to flow inside and the second port 32b may be connected to the fuel cell stack 60 to allow high-temperature cooling water to flow inside.

The fourth port 32d can control the flow rate of cooling water flowing inside through the ion filter loop (not shown) in accordance with rotation of the valve member 35.

The third port 32c is formed at the lower portion of the valve part 32 and can discharge low-temperature cooling water and high-temperature cooling water.

Meanwhile, the valve member 35 can rotate less than 5 degrees to 100 degrees to enable inflow and discharge of low-temperature cooling water or high-temperature cooling water.

Angles are limited for detailed description in relation to rotation of the valve member 35, but the angle may be applied differently.

In one form, seal members 100 being in contact with valve member 35 may be disposed at ends of the ports 32a, 32b, 32c, and 32d, respectively. The seal members 100 are inserted in the ports 32a, 32b, 32c, and 32d, so they may not be seen from the outside. The seal members 100 can seal the portions between the ports 32a, 32b, 32c, and 32d and the valve member 35. The seal members 100 can prevent leakage of cooling water flowing inside through the ports 32a, 32b, 32c, and 32d.

Figure 2:
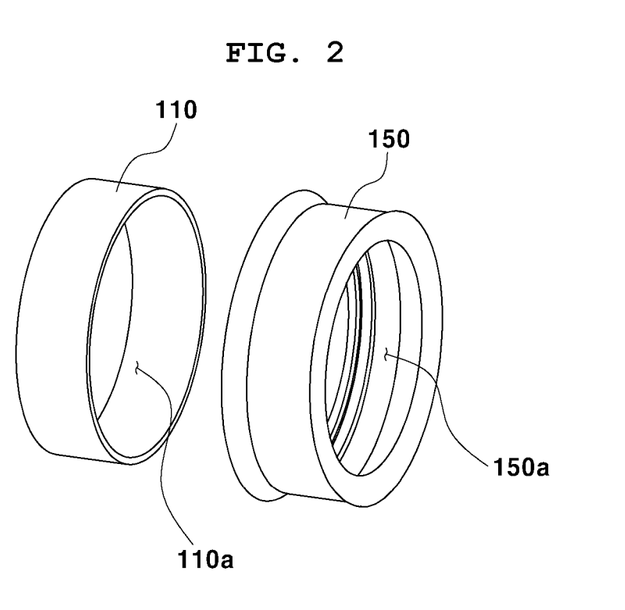
FIG. 2 is an exploded perspective view showing a seal member in one form of the present disclosure.

FIG. 2 is an exploded perspective view showing a seal member according to one form of the present disclosure.

Referring to FIGS. 1 and 2, the seal member 100 may include cylindrical metal part 110 and a valve seat 150. For example, the cylindrical metal part 110 may be made of aluminum (Al) or stainless steel (SUS) and the valve seat 150 may be made of a rubber material. In detail, the valve seat 150 may be made of Ethylene Propylene Diene Monomer (EPDM) rubber.

The cylindrical metal part 110 may be a component for supporting the seal member 100. In detail, the cylindrical metal part 110 may be made of a metal material to manage a dimensional difference that may be generated in the valve seat 150 made of a rubber material. The cylindrical metal part 110 may be defined as a passage through which cooling water flowing inside or discharged through the ports 32a, 32b, 32c, and 32d flows. Cooling water can flow through the space inside the cylindrical metal part 110. Accordingly, the cylindrical metal part 110 may have a cylindrical shape or a ring shape that has an empty space 110a inside. The cylindrical metal part 110 may have a shape extending in one direction.

Since the cylindrical metal part 110 is made of a hard material, the dimensional difference of the seal member 100 may be reduced. When the dimensions of the seal member 100 are larger than reference dimensions, excessive friction may be generated between the seal member 100 and the valve member 35. A motor (not shown) that drives the valve member 35 may be overloaded due to excessive friction between the seal member 100 and the valve member 35. The cylindrical metal part 110 helps keep the dimensions of the seal member 100 uniform, it is possible to inhibit or prevent the motor (not shown) from being overloaded.

The valve seat 150 may be provided to surround the outer surface of the cylindrical metal part 110. The valve seat 150 may have an empty space 150a inside. The valve seat 150 is made of a rubber material, thereby being able to keep the valve assembly 30 hermetic. In detail, the valve seat 150 can seal the portions between the ports 32a, 32b, 32c, and 32d and the valve member 35.

The seal member 100 may be manufactured by in-molding between the cylindrical metal part 110 and the valve seat 150. That is, the valve seat 150 may be formed to surround the cylindrical metal part 110 and a plurality of components of the valve seat 150 may be integrally formed. The components of the valve seat 150 will be described below.

According to the forms of the present disclosure, the configuration of the seal member 100 can be simplified, as compared with existing seal members. That is, the seal member 100 may be composed of only the cylindrical metal part 110 made of metal and the valve seat 150 made of rubber. Accordingly, the cost for maintaining the valve assembly 30 can be reduced. The process of manufacturing the seal member 100 can also be simplified.

Figure 3:
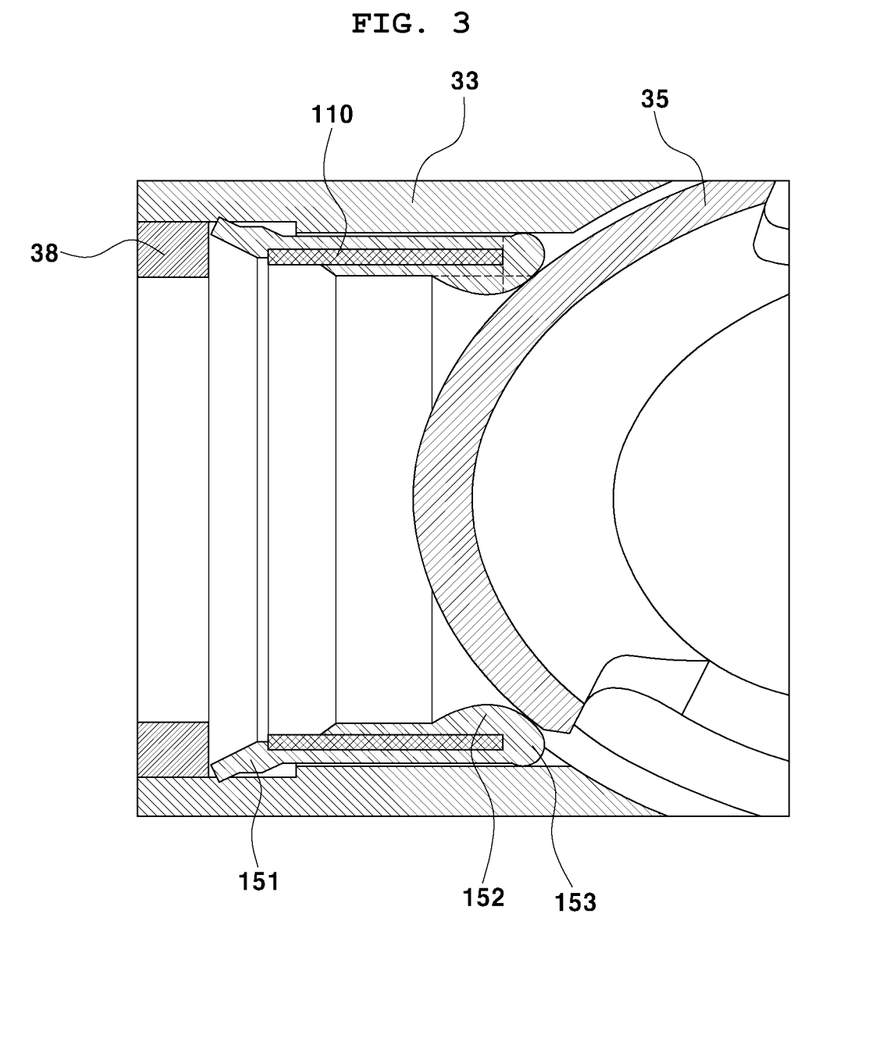
FIG. 3 is a cross-sectional view showing an assembly of the seal member and the valve assembly in one form of the present disclosure.
Figure 4:
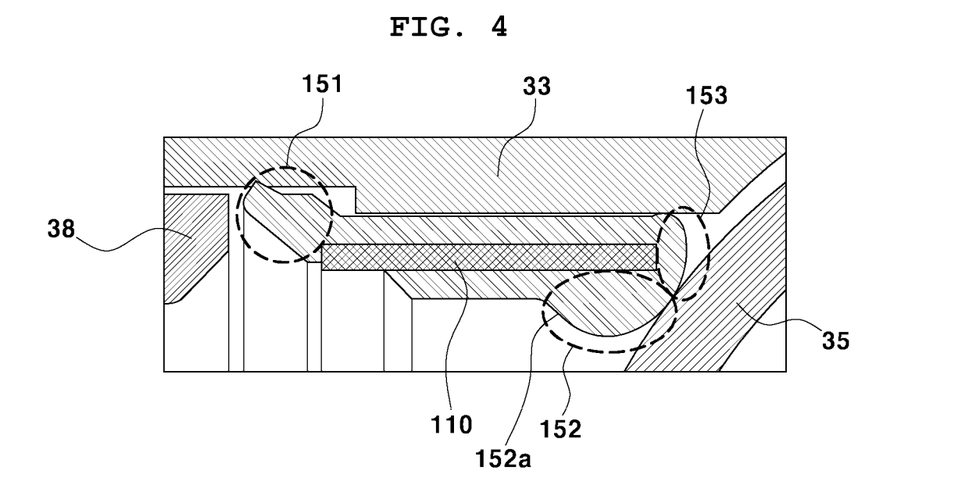
FIG. 4 is an enlarged view of the seal member of FIG. 3.

FIG. 3 is a cross-sectional view showing an assembly of the seal member and the valve assembly in one form of the present disclosure and FIG. 4 is an enlarge view of the seal member of FIG. 3.

Referring to FIGS. 1 to 4, the seal member 100 may be provided for each of the ports 32a, 32b, 32c, and 32d and may be inserted in an insertion space defined in each of the ports 32a, 32b, 32c, and 32d. The insertion space may be defined by an inner wall 33 of each of the ports 32a, 32b, 32c, and 32d and a flange 38 of each of the ports 32a, 32b, 32c, and 32d.

The valve seat 150 may be divided into a first sealing portion 151, a protrusion 152, and a second sealing portion 153. The first sealing portion 151, the protrusion 152, and the second sealing portion 153 may be integrally formed.

The protrusion 152 may be provided in a space close to the valve member 35. The protrusion 152 may protrude in a direction facing a channel from a first end of the cylindrical metal part 110. The direction facing the channel may mean a direction perpendicular to the direction in which the cylindrical metal part 110 extends. That is, the protrusion 152 may protrude toward the empty space 150a defined by the valve seat 150. In other words, the protrusion 152 may protrude toward the central axis of the ring-shaped valve seat 150. A first surface 152a of the protrusion 152 may have a slope with respect to the direction in which the cylindrical metal part 110 extends. The first surface 152a of the protrusion 152 may mean the portion to which pressure is transmitted from cooling water. Since the pressure of cooling water is transmitted to the first surface 152a of the protrusion 152, the ability to seal the portion between the second sealing portion 153 and the valve member 35 can be improved.

The first sealing portion 151 may extend from a second end of the cylindrical metal part 110 in the opposite direction to the extension direction of the cylindrical metal part 110. The first sealing portion 151 is provided in an area opposite to the valve member 35 with the cylindrical metal part 110 therebetween and may extend in the opposite direction to the valve member 35. The first sealing portion 151 may be disposed close to the flange 38 disposed in the insertion space. That is, the seal member 100 may be inserted in the insertion space such that the first sealing portion 151 is close to the flange 38. The first sealing portion 151 and the flange 38 may be spaced apart from each other. That is, the first sealing portion 151 is designed such that a tolerance exists between the first sealing portion 151 and the flange 38, thereby being able to inhibit or prevent the valve seat 150 from being forcibly inserted inside the inner walls of the ports 32a, 32b, 32c, and 32d.

In one form, the first sealing portion 151 may extend from the cylindrical metal part 110 while having a slope with respect to the extension direction of the cylindrical metal part 110. The first sealing portion 151 may extend away from the channel defined by the seal member 100. That is, the first sealing portion 151 may extend toward the inner wall 33 of each of the ports 32a, 32b, 32c, and 32d. In other words, the first sealing portion 151 may protrude radially with respect to the central axis of the ring-shaped valve seat 150. The first sealing portion 151 may be compressed toward the inner wall 33 by the pressure of cooling water, whereby the ability to keep the portion between the seal member 100 and the inner wall 33 can be improved.

In another form, the first sealing portion 151 may have elasticity to absorb pressure that is applied to the seal member 100 by the valve member 35. That is, the seal member 100 is pressed toward the flange 38 from the valve member 35 by rotation of the valve member 35. In other words, the first sealing portion 151 may be compressed toward the insertion space in which the seal member 100 is inserted by the pressure of cooling water. The first sealing portion 151 can absorb pressure to prevent the seal member 100 from being damaged by the pressure applied to the seal member 100. Since the first sealing portion 151 diagonally extends with respect to the cylindrical metal part 110, it can function as a kind of spring. Further, the first sealing portion 151 can prevent the seal member 100 from not being inserted into the insertion space due to a dimensional difference of the valve seat 150, or can prevent the seal member 100 from being damaged when the seal member 100 is inserted. That is, the first sealing portion 151 can prevent the seal member 100 from breaking by compressing.

The second sealing portion 153 may extend from the first end of the cylindrical metal part 110 in the extension direction of the cylindrical metal part 110. The second sealing portion 153 can keep the valve member 35 hermetic by being in contact with the valve member 35. An end of the second sealing portion 153 may be rounded to reduce deformation thereof due to rotation of the valve member 35. The second sealing portion 153 may be connected to the protrusion 152.

According to another form of the present disclosure, the seal member 100 can improve the ability to keep the portion between the inner wall 33 of each of the ports 32a, 32b, 32c, and 32d and the valve member 35, using the phenomenon that the first sealing portion 151 and the protrusion 152 are compressed by the pressure of cooling water. Further, deformation of the seal member 100 can be reduced even by rotation of the valve member 35 because of the shape of the second sealing portion 153 of the seal member 100.

Figure 5:
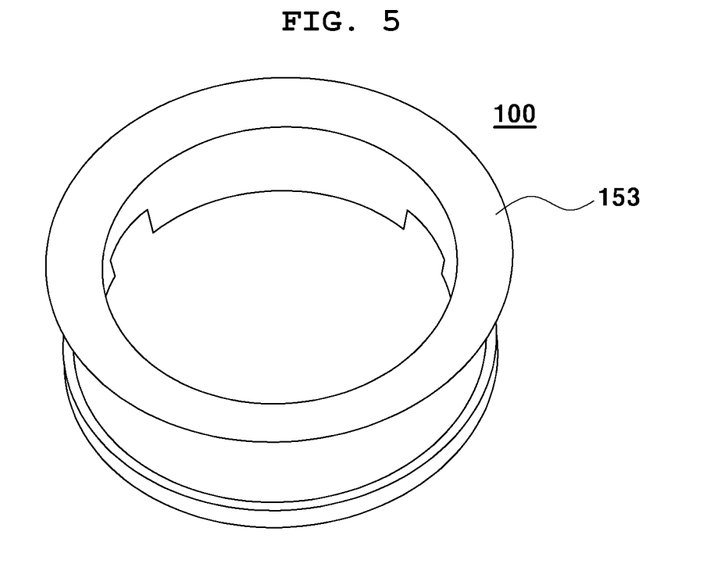
FIG. 5 is a view showing the upper portion of the seal member in one form of the present disclosure.
Figure 6:
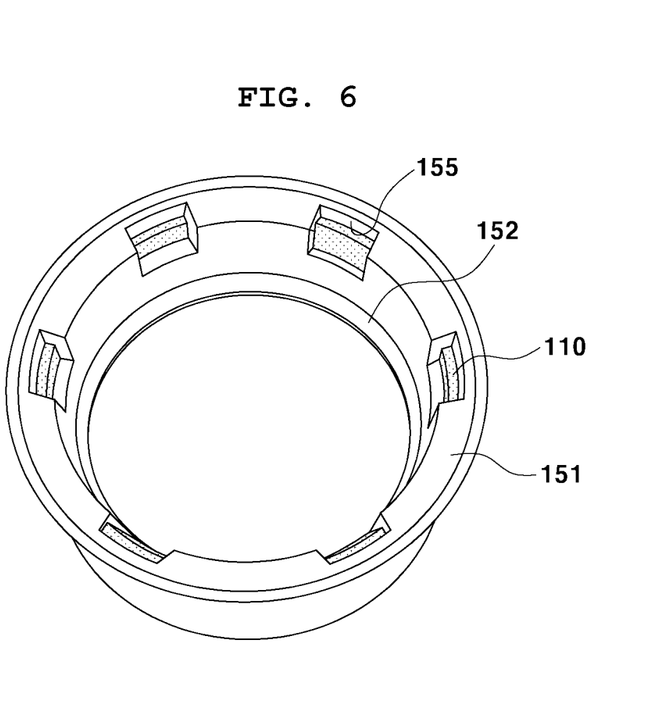
FIG. 6 is a view showing the lower portion of the seal member according to another form of the present disclosure.

FIG. 5 is a view showing the top of the seal member according to one form of the present disclosure, and FIG. 6 is a view showing the lower portion of the seal member in another form of the present disclosure.

Referring to FIGS. 5 and 6, the second sealing portion 153 may be formed on the top of the seal member 100. The second sealing portion 153 may protrude upward.

An opening 155 exposing the cylindrical metal part 110 may be formed through the bottom of the seal member 100. The opening 155 is a space defined by the valve seat 150 and can expose apportion of the second end of the cylindrical metal part 110. The exposed portion of the cylindrical metal part 110 can be cooled by cooling water flowing through the channel. Accordingly, it is possible to prevent a rapid increase of the temperature of the seal member 100 in the valve assembly at high temperature, so it is possible to prevent the seal member 100 from deforming at high temperature. Further, when the seal member 100 is cooled, the seal member 100 can be brought in closer contact with the valve member, so the ability to keep the valve assembly hermetic can be improved.

Although exemplary forms of the present disclosure were described above with reference to the accompanying drawings, those skilled in the art would understand that the present disclosure may be implemented in various ways without changing the necessary features or the spirit of the prevent present disclosure. Therefore, the forms described above are only examples and should not be construed as being limitative in all respects.

What is claimed is:

1. A seal member for a valve assembly controlling circulation of fluid, the seal member comprising:
   a cylindrical metal part configured to support the seal member and define a channel through which cooling water flows; and
   a valve seat provided to surround an outer surface of the cylindrical metal part and configured to keep the valve assembly hermetic,
   wherein the valve seat includes:
      a first sealing portion extending outwardly from a first end of the cylindrical metal part while forming an angle greater than 90 degrees relative to a direction of extension of the cylindrical metal part, and
      a protrusion protruding inwardly from a second end of the cylindrical metal part toward a center of the channel and configured to narrow a corresponding portion of the channel.

2. The seal member of claim 1, wherein the valve seat is made of a rubber material.

3. The seal member of claim 1, wherein a first surface of the protrusion has a slope with respect to the direction in which the cylindrical metal part extends.

4. The seal member of claim 1, wherein the first sealing portion is configured to extend with a slope with respect to the direction in which the cylindrical metal part extends, and extend away from the channel defined by the seal member.

5. The seal member of claim 4, wherein the first sealing portion has elasticity and configured to absorb pressure by a valve member being in contact with the seal member.

6. The seal member of claim 1, further comprising: a second sealing portion protruding from the second end of the cylindrical metal part in the direction in which the cylindrical metal part extends.

7. The seal member of claim 6, wherein an end of the second sealing portion is rounded.

8. The seal member of claim 1, wherein a portion of the first end of the cylindrical metal part is exposed through an opening of the valve seat, and
   the exposed portion of the first end of the cylindrical metal part is cooled by cooling water.

9. A valve assembly for controlling circulation of fluid, the valve assembly comprising:
   a valve body including: at least two ports formed on an outer surface thereof, and an internal space configured to communicate with the at least two ports;
   a valve member rotatably disposed in the internal space of the valve body and configured to open and close the at least two ports; and
   seal members configured to respectively seal the at least two ports,
   wherein the seal members each include:
      a cylindrical metal part configured to support a corresponding seal member among the seal members and define a channel through which cooling water flows; and
      a valve seat configured to surround an outer surface of the cylindrical metal part and keep a portion between the corresponding seal member and the valve member hermetic, and
   wherein the valve seat includes:
      a first sealing portion provided in an area opposite to the valve member with the cylindrical metal part therebetween and configured to extend outwardly in an opposite direction to the valve member, while forming an angle greater than 90 degrees relative to a direction of extension of the cylindrical metal part, and
      a protrusion disposed in an area close to the valve member and configured to protrude inwardly toward a center of the channel and narrow a corresponding portion of the channel.

10. The valve assembly of claim 9, wherein:
   the first sealing portion extends diagonally with respect to a second end of the cylindrical metal part and extends away from the channel.

11. The valve assembly of claim 10, wherein:
a first surface of the protrusion has a slope with respect to the direction in which the cylindrical metal part extends, and
a pressure provided by cooling water is transmitted to the first surface of the protrusion, thereby improving ability to keep a portion between the second sealing portion and the valve member hermetic.

12. The valve assembly of claim 9, wherein:
the first sealing portion has elasticity and is configured to absorb pressure by the valve member being in contact with the corresponding seal member, and
the first sealing portion is compressed toward an insertion space in which the corresponding seal member is inserted by pressure of cooling water.

13. The valve assembly of claim 9, further comprising:
a second sealing portion protruding from a first end of the cylindrical metal part in the direction in which the cylindrical metal part extends, and
wherein the second sealing portion is in contact with the valve member.

14. The valve assembly of claim 9, wherein:
a first end of the cylindrical metal part is close to the valve member, and
a second end of the cylindrical metal part is close to a flange of a port among the at least two ports.

\* \* \* \* \*